United States Patent
Uhl et al.

(10) Patent No.: US 6,896,185 B2
(45) Date of Patent: May 24, 2005

(54) OPTOELECTRONIC CODE READER

(75) Inventors: Hubert Uhl, Waldkirch (DE); Klemens Wehrle, Waldkrich (DE)

(73) Assignee: Sick AG, Waldkirch/Breisgau (DE)

( * ) Notice: Subject to any disclaimer, the term of this patent is extended or adjusted under 35 U.S.C. 154(b) by 11 days.

(21) Appl. No.: 10/369,979

(22) Filed: Feb. 18, 2003

(65) Prior Publication Data

US 2003/0234289 A1 Dec. 25, 2003

(30) Foreign Application Priority Data

Feb. 22, 2002 (DE) .......................................... 102 07 538

(51) Int. Cl.[7] .............................. G06K 7/10; G06K 7/14
(52) U.S. Cl. ............. 235/454; 235/462.14; 235/462.23; 250/201.2
(58) Field of Search ............................ 235/454, 462.01, 235/462.14, 462.22, 462.23, 462.24, 470; 250/559.24, 566, 201.2; 382/255

(56) References Cited

U.S. PATENT DOCUMENTS

| | | | | |
|---|---|---|---|---|
| 5,185,822 A | * | 2/1993 | Miura | 382/255 |
| 5,436,439 A | * | 7/1995 | Nishimura et al. | 235/462.14 |
| 5,448,078 A | * | 9/1995 | Nakazawa | 250/559.24 |
| 5,616,909 A | * | 4/1997 | Arackellian | 235/462.22 |
| 5,633,487 A | * | 5/1997 | Schmutz et al. | 235/462.22 |
| 5,869,827 A | | 2/1999 | Rando | |
| 6,053,409 A | * | 4/2000 | Brobst et al. | 235/462.22 |
| 6,129,280 A | * | 10/2000 | De Renzis et al. | 235/462.22 |
| 6,213,397 B1 | * | 4/2001 | Rando | 235/454 |
| 6,347,740 B1 | * | 2/2002 | Bengala | 235/454 |
| 6,371,371 B1 | * | 4/2002 | Reichenbach | 235/454 |

FOREIGN PATENT DOCUMENTS

| | | |
|---|---|---|
| DE | 19840455 A1 | 3/2000 |
| EP | 0359010 B1 | 1/1998 |
| EP | 0851376 A1 | 7/1998 |

* cited by examiner

*Primary Examiner*—Jared J. Fureman
(74) *Attorney, Agent, or Firm*—Townsend and Townsend and Crew LLP

(57) ABSTRACT

The invention relates to an optoelectronic code reader and to a method for the reading in of codes, which move relative to the code reader within a reading zone, by scanning the reading zone at least along one scan direction. For the reading of codes which are arranged along the scan direction at different distances to the code reader, at least one first scanning device and one second scanning device are provided which are controlled along the scan direction at different focal positions.

20 Claims, 4 Drawing Sheets

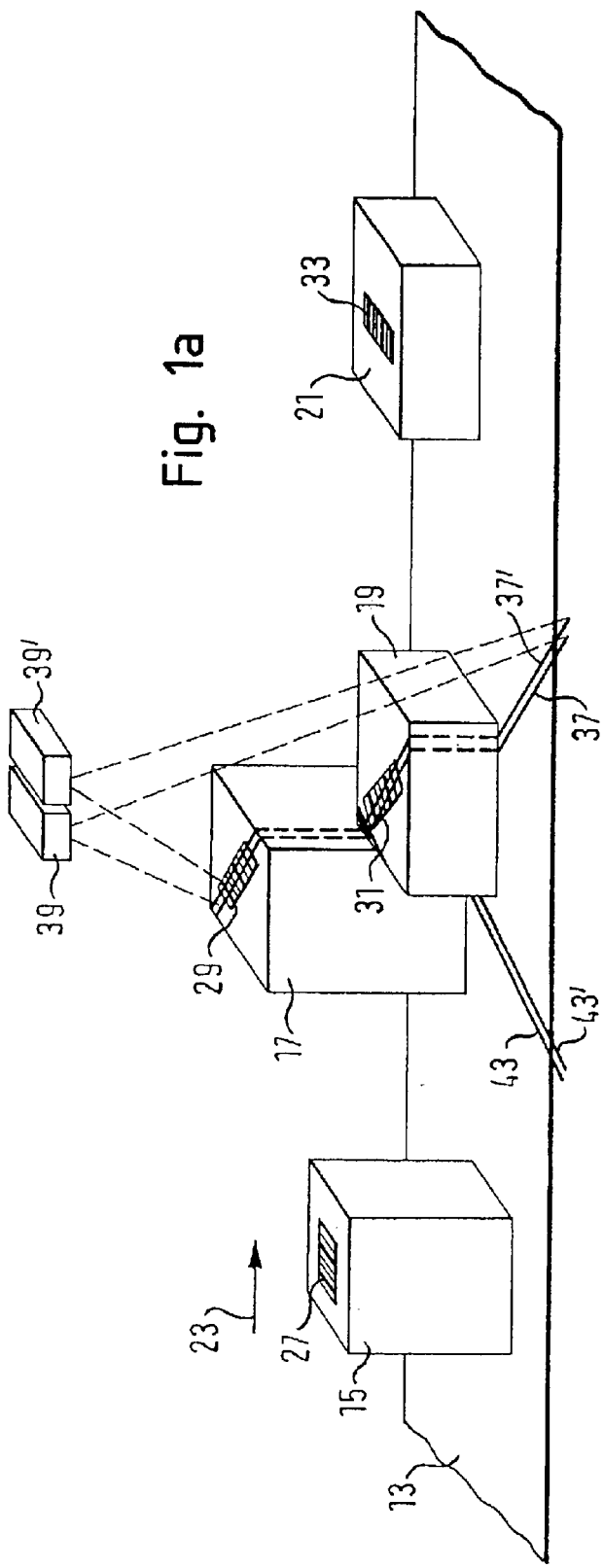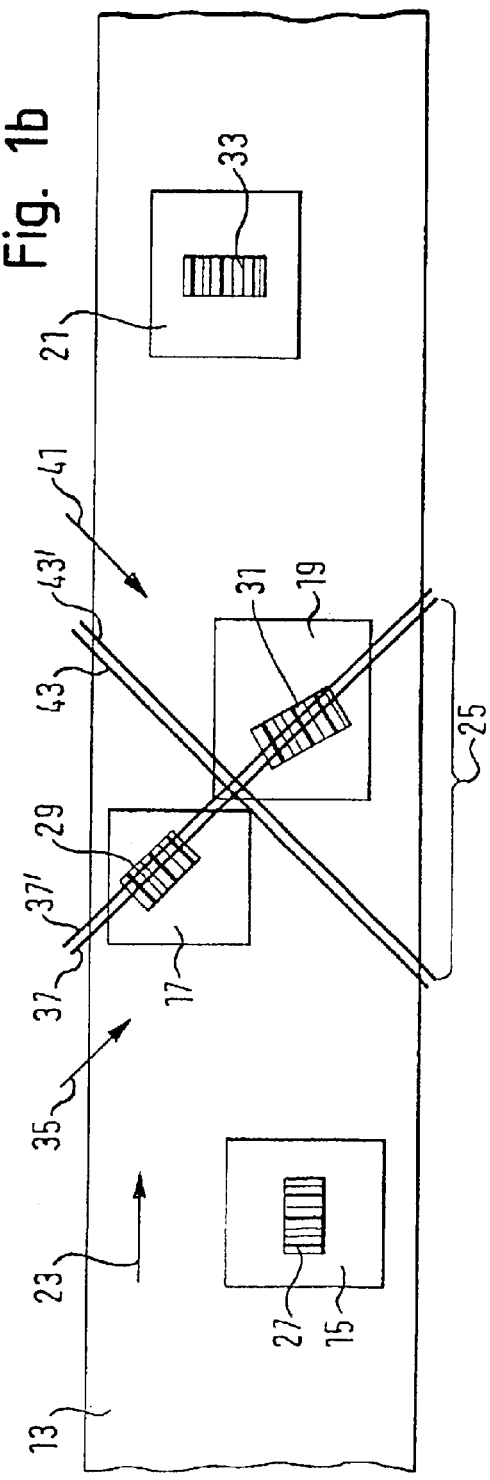

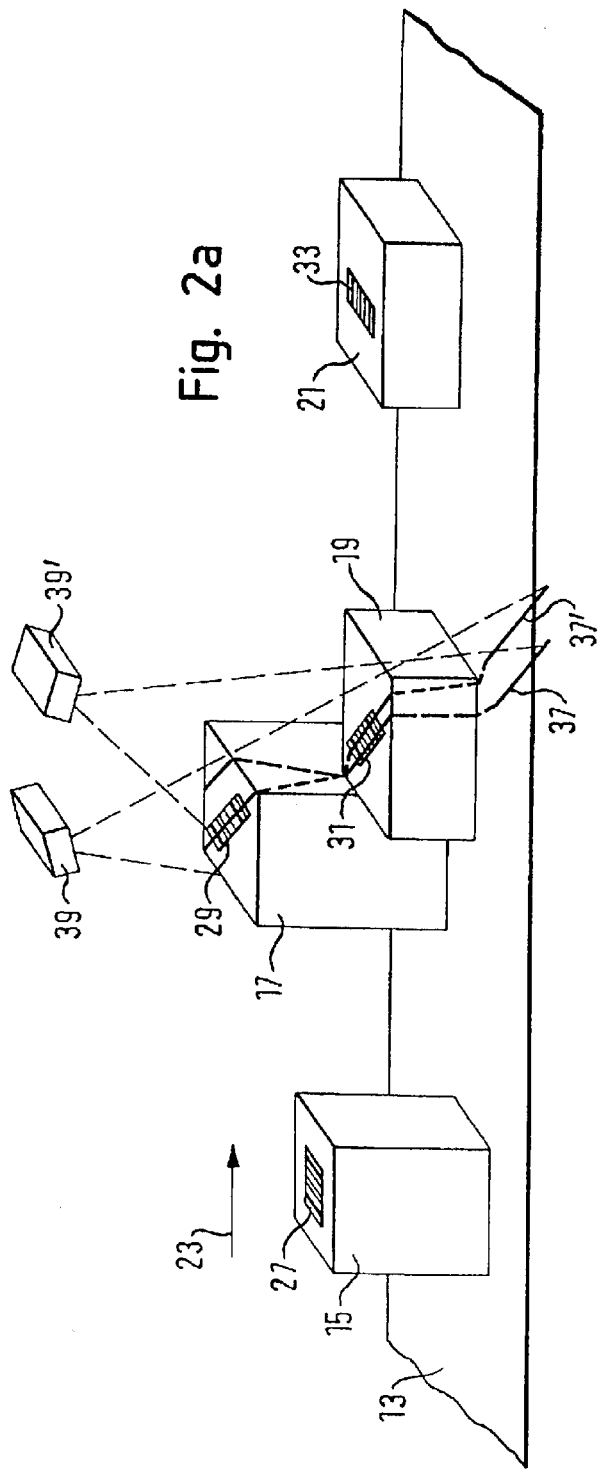
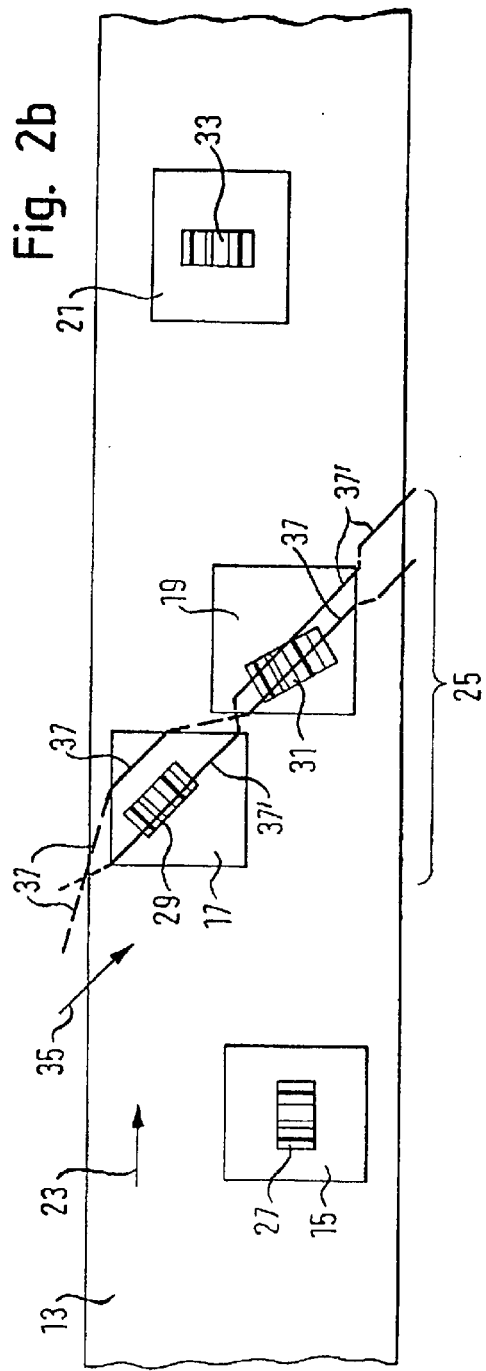

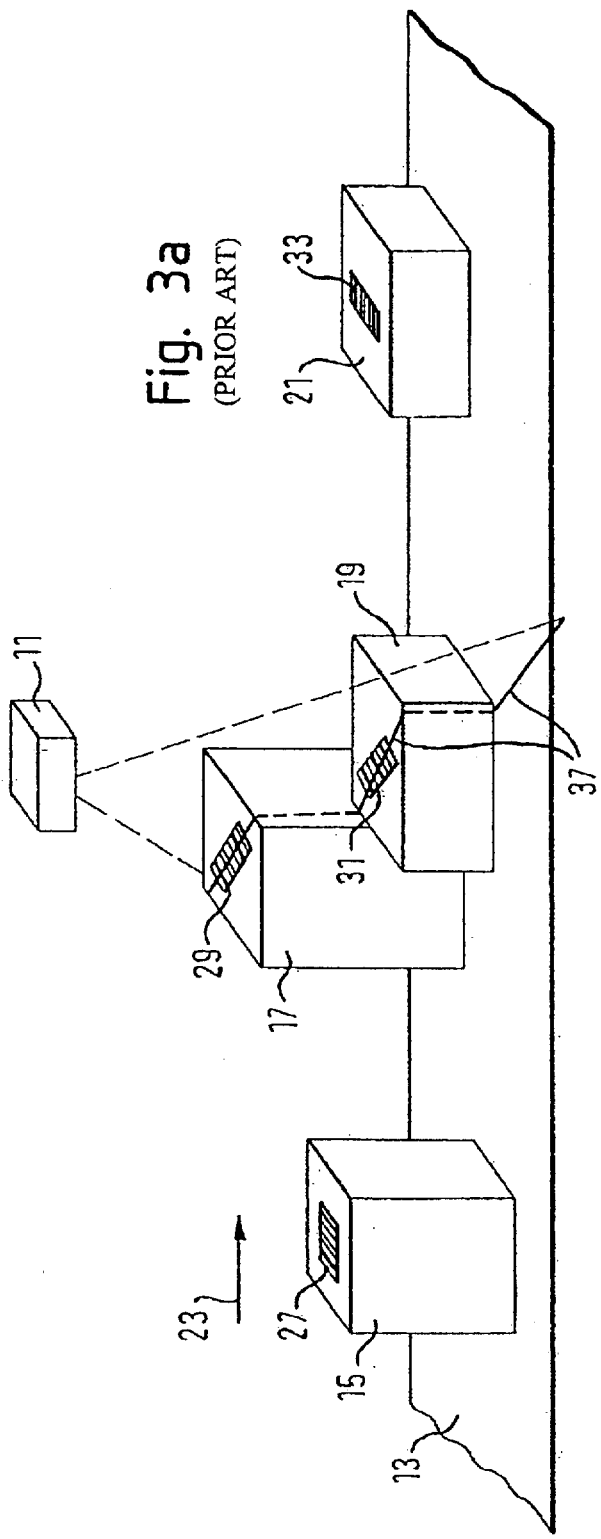
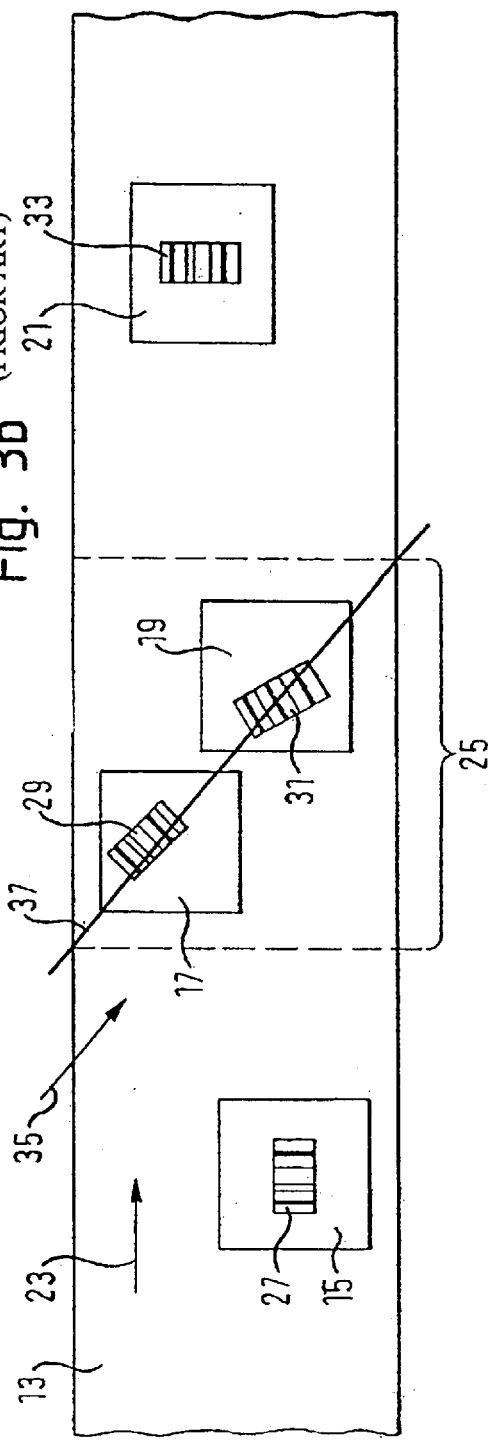

OPTOELECTRONIC CODE READER

BACKGROUND OF THE INVENTION

The invention relates to an optoelectronic code reader and to a method for the reading in of codes which move relative to the code reader inside a reading zone, with the reading zone being scanned at least along a scan direction.

Such a reading in of codes takes place with a barcode scanner, for example, in that a laser beam is periodically guided over the reading zone along the scan direction by means of a rotating polygon mirror, with the reflected light being supplied to a light receiver. Depending on whether the laser beam is reflected at a light or a dark surface, a light amount of a different strength is incident on the receiver. The corresponding output signals of the receiver are evaluated with respect to the presence, and where applicable to the content, of a barcode by means of an evaluation device.

Optical codes can also be read in, for example, by means of a line scan camera which is able to scan linear image information corresponding to the scan direction simultaneously by means of a plurality of light receiving elements arranged in a line in order to subsequently evaluate these for the presence of a code.

The scanning of the reading zone at least along the scan direction is necessary with such code readers since, with the usual codes, the information to be read in along an information arrangement device is encoded. For instance, a barcode consists, for example, of light and dark bars which are arranged next to one another along the information arrangement direction. Only when the scan direction agrees with the information arrangement direction or adopts a certain critical scanning angle can the code be read in correctly.

It is a common feature of this kind of code readers that they have a limited focusing range, that is, a limited depth of field. This can result in problems if a plurality of codes should be read in successively which are arranged at objects—for example mail packages—of a different height and thus adopt different distances to the code reader. In this case, all the codes can only be read in correctly if a matching of the focal position of the code reader is carried out between the scanning of the different codes.

However, this remedy is also problematic, and indeed in particular when the different codes are moved through the reading zone of the code reader along a conveying direction and should be scanned along a scan direction which extends perpendicular or diagonally to the conveying direction. The situation can occur in this case that two codes are arranged along the scan direction in the reading zone of the code reader which adopt a different distance to the code reader.

If the focal position is changed in this situation during the scanning along a scan direction, in order to correctly read in both codes, the movement of the code along the conveying direction can at best take place at a very reduced speed at times. The changing of the focal position namely requires a certain length of time so that scanning along the scan direction requires a corresponding minimum time. If, however, the codes are moved too fast in the conveying direction during scanning, the code to be read in last has possibly already left the scan line before the total scanning process along the scan line has been completed.

SUMMARY OF THE INVENTION

It is therefore an object of the invention to provide a code reader and a reading in method which also allow the reading in of codes guided in the reading zone in a manner which is simple to implement, when a plurality of codes are arranged along the scan direction of the code reader and adopt different distances to the code reader.

This object is satisfied in that at least two scanning devices, namely a first scanning device and a second scanning device, are provided for the scan direction which can be controlled so that they scan the reading zone along the scan direction at different focal positions, i.e. at different focus settings.

In the invention, a plurality of scanning devices are therefore provided for the scan direction of the code reader, with these scanning devices—optionally—being focused on different focal positions, in order to be able to read in a plurality of codes which are arranged relative to one another along the scan direction of the code reader and adopt different distances to the code reader. A certain redundancy is thus deliberately provided in the invention by a multiple scanning along the scan direction of the code reader so that, for the case that a plurality of codes enter into the reading zone of the code reader, a sufficient number of scanning devices, and thus a sufficient number of possible different focal positions, are available for the same scan direction.

If, therefore, a plurality of objects move through the reading zone of the code reader so that they are arranged adjacent to one another—with respect to the scan direction of the code reader—and adopt a different distance to the code reader, a plurality of scanning devices are available which can focus their focal positions differently, and indeed in each case for one of the codes. It is thus avoided that only the code of a single focal position can be read in along the scan direction of the code reader, or that only a very slow relative movement is possible between the code reader and the codes in order to be able to change the focal position along the scan direction.

In accordance with a preferred embodiment, the reading in of the codes introduced into the reading zone takes place—at least at times—in cooperative coordination between the scanning devices, and indeed in that the focal positions of the scanning devices are focused alternately on the respectively next code introduced into the reading zone. In other words, each scanning device takes over the reading in of a specific code in the reading zone of the code reader in order to detect the next code, after the termination of such a reading in process, which has been introduced into the reading zone and has, in the meantime, not been detected by another scanning device. Sufficient time is thereby available for the reading in of each code in order to be able to focus the focal position of the relevant scanning device on the respective code, without unwanted restrictions of the speed at which the codes are guided through the reading zone having to be accepted.

Such a cooperative focusing of the scanning device is accordingly in particular of advantage if a plurality of codes are in the reading zone and the risk therefore exists that, due to an arrangement of codes at different spacings along the scan direction, it is not possible to focus sufficiently fast onto one of these codes.

The control of the focusing of the scanning devices preferably takes place in dependence on the number of codes in the reading zone of the code reader. Alternatively, or additionally, the control takes place in dependence on the mutual spacing of the codes guided in the reading zone. Furthermore, the focal positions can be controlled in dependence on the mutual relative positions of the codes with respect to the scan direction of the code reader in order to provide an individual focusing of the scanning devices, for example, when two codes are arranged adjacent to one another in the scan direction. Such a control makes it possible to carry out an individual focusing of the redundantly arranged scanning devices at different focal positions just when predetermined recognition criteria are satisfied which allow the risk of the presence of differently spaced codes in an arrangement along the scanning device to be recognized.

The scanning devices are preferably controlled so that, alternatively, the explained cooperative focusing on different codes takes place or—in particular with a large mutual spacing of the codes—a standard focusing takes place at which all scanning devices adopt a common focal position optimum for the current reading task. A switch can in particular be made from the cooperative focusing to the standard focusing when the explained recognition criteria for the identification of a potentially problematic reading task are not satisfied, or when the last code in the reading zone has been read in successfully in accordance with the cooperative focusing of the scanning devices.

Such a switch to the standard focusing of the scanning devices to a common focal position has the advantage that the plurality of scanning devices can be utilized for the production of redundancy with respect to the information read in, since, for example, a single code can be read in by a plurality of scanning devices and the respective code information gained can be compared to one another for control purposes.

It is preferred for the code reader to have an image detection sensor—as a master scanner—by which the explained recognition criteria for a potentially difficult reading task can be determined. Accordingly, such an image detection sensor can be used for the detection of the number of codes in the reading zone, for the detection of the mutual spacing of the codes in the reading zone, and/or for the detection of the relative arrangement of the code with respect to the scan direction of the code reader, in order to forward this information to a control device for the scanning devices. It is sufficient for these purposes for the image detection sensor to detect the reading zone, or an upstream detection zone, two-dimensionally. The relative arrangement of the codes can be determined directly or derived from the object arrangement detected.

Alternatively to this, a simple optoelectronic or other object detection sensor can be provided in order to detect the intrusion or presence of objects in the reading zone and to control the reading process accordingly. For example, a light barrier or a light sensor can be arranged at a conveyor belt in order to detect the passing of conveyed goods on which the codes to be read in can then be inspected. A conclusion can thus be drawn on the position of a code to be read in using the information supplied by the sensor on the position of an object and due to a tracking of the object movement for example by incremental transducers at a conveyor belt. A control is thereby possible for the cooperative focusing without using the image detection sensor.

It is further preferred for the code reader to have at least one distance measuring device by means of which the distance between the codes guided in the reading zone and the code reader can be determined. This distance information is used for the control, and optionally for the individual focusing, of the scanning devices. Each scanning device can also have its own distance measuring device.

A further problem with known code readers lies in a geometrical shadowing of the scan beam of the relevant code reader by an object in the reading zone so that a code arranged in the scanning shadow of this object cannot be read in correctly. Furthermore, the problem exists with known code readers that, with codes under transparent film, total reflections can occur at the film and can prevent a correct reading in of the code information.

These problems are avoided in a preferred further development of the invention in which the scan beam paths extend inclined to one another. The reading zone of the code reader can be detected using scan beams at different inclination angles due to the presence of a plurality of scanning devices so that the inclinations can be selected so that there are no common shadowing zones for the scanning devices and also so that total reflections or further reflection effects are avoided. This further development is therefore of particular advantage when the code information is read in redundantly, i.e. when the scanning devices are focused on a common focal position in accordance with the explained standard focusing.

It is in particular sufficient for the avoidance of geometrical shadowing or of reflection effects for the respective scan beam path of the scanning devices to adopt a slight inclination angle (skew angle) with respect to the orthogonal relative to the reading surface, that is, with respect to the orthogonal relative to that direction which is perpendicular to the direction of the relative movement of the code reader and the codes, on the one hand, and relative to the direction of extent of the codes, on the other hand. This skew angle can, for example, amount to between 2° and 20°, in particular approximately 10°.

Alternatively or additionally, an inclined arrangement of the scanning devices relative to one another with respect to the direction of the relative movement of the code reader and the codes can be provided so that, for example, the first scan direction is therefore inclined obliquely in the direction of movement of the codes and the second scanning device is inclined obliquely opposite to the direction of movement of the codes.

It is possible with respect to the constructional implementation of the first and second scanning devices for these to be formed—at least partly—by separate units. The scanning devices can therefore each have its own light transmitter, its own optical transmitting system, its own optical receiving system and/or its own evaluation device.

Alternatively to this, the invention can also be implemented in that the first scanning device and the second scanning device are formed—at least partly—by a common scanning unit. In this case, a common light transmitter, a common optical transmitting system, a common optical receiving system, a common light receiver and/or a common evaluation device are provided for the scanning devices.

It is preferred with respect to the scanning of the reading zone both by the first scanning device and by the second scanning device along the common scan direction for the scan to take place along scan lines which are each associated with a scan direction and extend in parallel adjacent to one another in the reading zone. In this case, the scan lines of the different scanning devices can therefore be selected so that they each extend parallel to the common scanning device and are spaced sufficiently apart from one another to ensure that the scanning devices, or the associated scan beams, do not cause any mutual disturbance of the reading in processes.

Alternatively to this, it is possible for the scan lines of the plurality of scanning devices along the reading zone of the code reader to coincide. This is in particular possible when the relevant scanning devices are formed—at least in part—by a common scanning unit.

The invention and the advantages associated with it can moreover even be realized when the scanning of the reading zone by the first and second scanning devices does not take place exactly parallel to the scan direction of the code reader, but when the respective scan lines extend obliquely to one another at an acute angle, or intersect at an acute angle. It is namely decisive that a code whose information arrangement direction extends parallel to the scan direction of the code reader must still be able to be read in by both scanning devices. This is, for example, also still ensured for a barcode, however, when it is scanned along scan lines which extend at a critical scanning angle of +/−30° with respect to the orientation or to the information arrangement direction of the code.

In accordance with a further preferred embodiment, the code reader is additionally designed for the scanning of the reading zone along a further scan direction. The scanning of the reading zone along the scan direction, and along the further scan direction extending diagonally with respect to it, namely allows the reading in of codes at any angular position of their information arrangement direction (omnidirectional reading possibility). The code reader is also preferably controllable with respect to this further scan direction for the scanning of the reading zone at different focal positions in order also to be able to read in a plurality of codes at different distances without problem and fast with respect to this further scan direction.

It must finally be noted that the invention is suitable for the reading in of one-dimensional or two-dimensional codes and can accordingly be used, for example, for barcode scanners, line scan cameras or matrix cameras. It is moreover possible to provide, instead of two scanning devices, three or more scanning devices in a redundant arrangement for scanning along a common scan direction at different focal positions.

The invention will be explained in the following by way of example with reference to the drawings.

BRIEF DESCRIPTION OF THE DRAWINGS

FIGS. 1a and 1b show a code reader in accordance with the invention and the corresponding reading situation in a perspective view and in a plan view respectively;

FIGS. 2a and 2b show a further embodiment of a code reader in accordance with the invention and of the corresponding reading situation in a perspective view and a plan view respectively;

FIGS. 3a and 3b show a known code reader and the corresponding reading situation in a perspective view and in a plan view respectively.

DESCRIPTION OF THE PREFERRED EMBODIMENTS

Figure 4A:
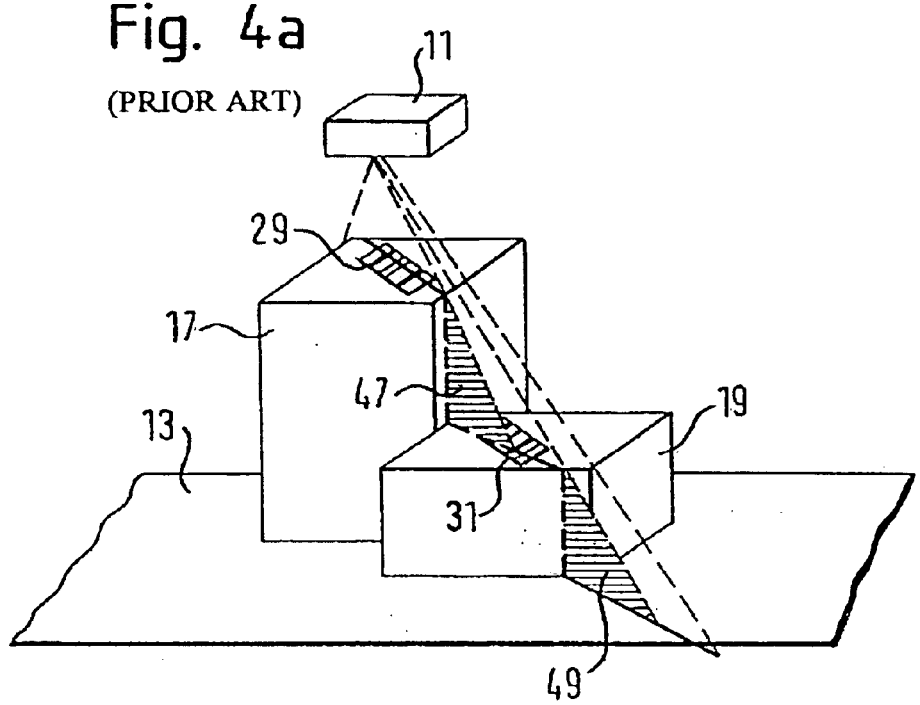
FIGS. 4a and 4b show a known code reader and the corresponding reading situation in a perspective view and in a plan view respectively.

FIGS. 3a and 3b show a conventional barcode scanner 11 and a typical reading situation. A plurality of packages 15, 17, 19, 21 are moved along a conveyor device 23 through a reading zone 25 of the barcode scanner 11 by means of a conveyor belt 13. Each package 15, 17, 19, 21 is provided with a one-dimensional code 27, 29, 31 or 33.

The barcode scanner 11 scans the reading zone 25 in that a laser beam, which appears point-shaped per se at the reading zone 25, is guided over the conveyor belt 13. Since this scan beam is guided periodically over the reading zone 25 along a scan direction 35 at a high scanning speed, the scanning ultimately takes place along a scan line 37 which appears as a continuous straight line in the idealized representation in the plan view in accordance with FIG. 3b. As soon as a code 29, 31 is detected along this scan line 37, and thus along the scan direction 35, the barcode scanner 11 can—using the contrast ratios of the reflected light caused by the code 29, 31—read in and evaluate the information encoded therein.

However, there is a problem in the barcode scanner 11 shown in FIGS. 3a and 3b in that it only has a limited depth of field and can therefore not read in the codes 29 and 31, which are arranged on packages 17 and 19 respectively at different heights, and thus adopt different distances to the barcode scanner 11, without an intermediate adjustment of its focal position. However, an intermediate change in the focal position of the barcode scanner 11 while the scan beam is guided in the scan direction 35 along the scan line 37 takes up a comparatively long period of time so that the scan beam can only be guided slowly along the scan direction 35. Accordingly, the conveyor belt 13 can only be moved slowly in the conveying direction 23 in order not to pass over codes between succeeding scanning procedures which are located therebetween. If, however, the focal position of the barcode scanner 11 is not matched, the codes 29 and 31 cannot be read in correctly.

FIGS. 1a and 2b show a solution of this problem in accordance with the invention which takes the special situation shown in FIGS. 3a, 3b and 1a, 1b into account in which a plurality of codes 29, 31 are arranged adjacent to one another with respect to the scan direction 35 of the code reader and adopt a distance of a different length to the code reader.

A first scanning device 39 and a second scanning device 39' are provided here for the scanning of the reading zone 25. These are, for example, designed in the manner of a barcode scanner so that they each scan the reading zone 25 by means of a laser beam periodically deflected along the scan direction 35. Accordingly, this scanning of the reading zone 25 in accordance with FIG. 1b takes place along a first scan line 37 and along a second scan line 37'. The scan lines 37 and 37' extend in the scan direction 35 and thus parallel to one another and they are spaced slightly apart from one another with respect to the conveying direction 23—in accordance with an arrangement of the scanning devices 39, 39' offset with respect to one another.

In accordance with the invention, the scanning devices 39, 39' can be controlled—at least optionally—so that they adopt different focal positions. The code reader in accordance with FIGS. 1a and 1b can thereby read in codes which are arranged along the scan direction 35 and have different distances to the code reader in a respectively matched focal position. The two codes 29 and 31 can in particular be read in correctly by means of the two scanning devices 39, 39' although they are arranged on packages 17 and 19 of different heights. For this purpose, the first scanning device 39 is focused on the code 29 and the second scanning device 39' on the code 31.

No intermediate change in the focal position of the relevant scanning devices 39 and 39' respectively is thus required during the scanning of the reading zone 25 along the scan line 37 or 37'. Accordingly, the scanning along the scan line 37 or 37' can take place at a high repeat speed so that a continuous movement of the conveyor belt 13 along the conveying direction 23 is possible at a comparatively high speed without there being any risk that directly adjacent codes are not detected, and are thus overlooked, by two succeeding scanning processes.

The control of the scanning devices 39, 39' preferably takes place by means of a control device which is not shown in FIGS. 1a and 1b and which is connected to an image detection sensor which is likewise not shown. This determines the number of the codes 29, 31 currently present in the reading zone 25. If a predetermined minimum number of codes 29, 31, for example two codes, is detected, the control device causes the scanning devices 39, 39' to make a cooperative focusing. This means that each of the scanning devices 39, 39' is respectively focused on one code 29, 31 and focuses its focal position, after a successful reading in of the relevant code 29, 31, onto the respective next "free" code 27, i.e. the code not yet detected by the other scanning device 39' or 39 respectively.

If, in contrast, the signals of the image detection sensor show that the aforesaid recognition criterion for the presence of a potentially problematic reading situation is not satisfied, the control device causes the two scanning devices 39, 39' to make a standard focusing. This means that the scanning devices 39, 39' adopt a common focal position for the code just located in the reading zone 25.

Instead of the image detection sensor, a simple object detection sensor can also be provided, that is, a sensor for the detection of objects without detection of resolved image information.

FIGS. 1a and 1b furthermore show that the scan direction 35 of the scanning devices 39, 39' extend diagonally with respect to the conveying direction 23.

FIGS. 1a and 1b moreover show a further development of the invention in which the scanning devices 39, 39' are additionally designed for the scanning of the reading zone 25 along a further scan direction 41. For this purpose, the respective scan beam of the scanning devices 39, 39' is alternately deflected along the scan direction 35 and along the further scan direction 41 so that additionally a scanning of the reading zone 25 takes place along further scan lines 43 or 43'. The scan line 37 and the further scan line 43 of the first scan direction 39, as well as the scan line 37' and the further scan line 43' of the second scanning device 39', extend perpendicular to one another in the plan view in accordance with FIG. 1b and accordingly each appear X-shaped.

This scanning of the reading zone 25 along the scan direction 35 and along the further scan direction 41 has the effect that the codes 27, 29, 31, 33 can generally be read in any rotational position since either the scan direction 35 or the further scan direction 41 always agrees sufficiently with the information arrangement direction of the code in question. In other words, the code in question is always constantly completely detected either by the scan lines 37, 37' or by the further scan lines 43, 43'.

It must still be mentioned with respect to this embodiment that the scanning along the further scanning device 41 can naturally also take place by additional separate scanning devices instead of by the scanning devices 39, 39'.

Figure 4B:
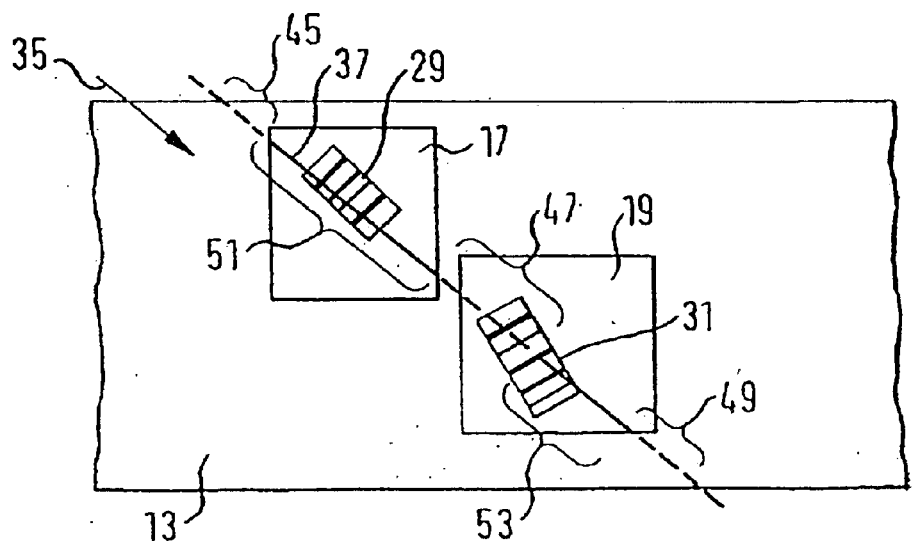

FIGS. 4a and 4b show a further problem which can occur with known code readers. A barcode scanner 11 is shown in FIG. 4a which is arranged at a comparatively small spacing above a package 17 at whose upper side a code 29 to be read in is arranged. A scanning along a scan direction 35 also takes place here so that the guiding of the scan beam appears as a scan line 37 in the plan view in accordance with FIG. 4b.

However, due to the finite distance of the barcode scanner 11 to the conveyor belt 13 located thereunder, and in particular due to the comparatively small distance to the upper side of the package 17, geometrical shadowing effects occur. In particular, two regions 45, 47 are shadowed by the upper side of the package 17 and one region 49 of the scan line 37 is shadowed by the upper side of the package 19 so that in this case a reading in of codes along the scan line 37 is only possible along two effective reading sections 51, 53. This has the consequence in the example shown that the code 31 on the package 19 cannot be read in completely due to the shadowing and thus cannot be read in correctly.

This problem can be avoided in an advantageous manner in the invention. FIGS. 2a and 3b show, in a further development of the embodiment in accordance with FIGS. 1a and 1b, that the scan directions 39, 39' have scan beam paths extending in an inclined manner with respect to one another for this purpose. For this, the scanning devices 39, 39' are arranged spaced apart from one another along the conveying direction 23 and they are inclined by an angle of inclination of 10° in each case in or opposite to the conveying direction 23 with respect to the vertical. This has the effect that there are no common shadowing zones of the two scanning devices 39, 39' and codes can therefore also always be read on low packages 19.

The plan view in accordance with FIG. 2b shows that the scan lines 37, 37' only have a rectilinear extent regionally due to the respective inclination of the scanning devices 39, 39' and to the different height of the packages 17, 19 and of the conveyor belt 13.

The arrangement of the scan directions 39, 39' explained with reference to FIGS. 2a and 2b with opposite angles of inclination is also suitable to avoid total reflections or other reflection effects which can occur, for example, if the surface of the packages 15, 17, 19, 21 is provided with a reflecting film and which can result in incorrect readings with a purely orthogonal scanning.

What is claimed is:

1. An optoelectronic code reader for the reading in of codes, which move relative to the code reader within a reading zone, by scanning the reading zone at least along one scan direction, comprising one of an image detection sensor and an object detection sensor for at least one of the detection of the number of codes in the reading zone, the detection of the mutual spacing of the code in the reading zone and the detection of the relative arrangement of the codes with respect to the scan direction, for the reading in of codes which are arranged along the scan direction at different distances to the code reader, at least one first scanning device and one second scanning device which can be controlled for scanning along the scan direction at different focal positions, the first and second scanning devices being controlled so that on the presence of a predetermined minimum number of codes in the reading zone, when a predetermined minimum mutual spacing of the codes in the reading zone is not achieved and/or when a plurality of codes are arranged next to one another along the scan direction, the focal positions of the first scanning device and of the second scanning device are focused on different codes and otherwise the first scanning device and the second scanning device are focused on a common focal position.

2. A code reader in accordance with claim 1, characterized in that the code reader has at least one distance measurement device for the determination of the distance between a code and the code reader.

3. A code reader in accordance with claim 1, characterized in that, for the avoidance of a geometrical shadowing of a scanning device by an object located in the reading zone, or for the avoidance of reflection effects at the code to be scanned,
the first scanning device and the second scanning device have scan beam paths extending inclined to one another; and/or
the first scanning device and the second scanning device are arranged spaced apart from one another.

4. A code reader in accordance with claim 3, characterized
in that the angle of inclination of the scan beam path of a scanning device with respect to the orthogonal at the direction of the relative movement of the code reader and the codes amounts to between 2° and 20°; and/or
in that the scan beam path of the first scanning device extends inclined in the direction of the relative movement of the code reader and of the codes, and the scan beam path of the second scanning device extends inclined opposite to this direction.

5. A code reader in accordance with claim 3, characterized in that the first scanning device and the second scanning device are arranged spaced apart from one another with respect to the direction of the relative movement of the code reader and of the codes.

6. A code reader in accordance with claim 1, characterized in that the first scanning device and the second scanning device are formed—at least in part—by separate units.

7. A code reader in accordance with claim 1, characterized in that the first scanning device and the second scanning device are formed—at least in part—by a common scanning unit.

8. A code reader in accordance with claim 1, characterized in that the first scanning unit and the second scanning unit are formed for the scanning of the reading zone along adjacent and parallel scan lines.

9. A code reading in accordance with claim 1, characterized in that the first scanning device and the second scanning device are formed for the scanning of the reading zone along coinciding scan lines.

10. A code reader in accordance with claim 1, characterized in that the first scanning device and the second scanning device are formed for the scanning of the reading zone along scan lines which extend inclined to one another at an acute angle.

11. A code reader in accordance with claim 1, characterized in that the scanning device extends diagonally with respect to the direction of the relative movement of the code reader and of the codes.

12. A code reader in accordance with claim 1, characterized in that the code reader is additionally formed for the scanning of the reading zone at least along a further scan direction.

13. A code reader in accordance with claim 12, characterized in that the scan direction and the further scan direction extend diagonally or perpendicular to one another.

14. A code reader in accordance with claim 12, characterized in that the code reader is also provided for scanning in different focal positions with respect to the further scan direction.

15. A code reader in accordance with claim 12, characterized
in that the first scanning device and the second scanning device are also provided for the scanning of the reading zone along the further scan direction; or
in that at least one additional scanning device is provided for the scanning of the reading zone along the further scan direction.

16. A code reader in accordance with claim 1, characterized in that the code reader is formed as a barcode scanner, as a line scan camera or as a matrix camera.

17. A method for the reading in of codes, which move within a reading zone relative to a code reader, comprising scanning the reading zone at least along one scan direction, detecting at least one of the number of codes in the reading zone, a mutual spacing of the codes in the reading zone and a relative arrangement of the codes with respect to the scan direction,
for reading in codes which are arranged along the scan direction at different distances to the code reader, providing at least one first scanning device and one second scanning device for scanning the reading zone at different focal positions along the scan direction, controlling the scanning devices so that, on the presence of a predetermined minimum number of codes in the reading zone, when at least one of a predetermined minimum mutual spacing of the codes in the reading zone is not achieved and a plurality of codes are arranged next to one another along the scan direction, focusing the focal positions of the first scanning device and of the second scanning device on different codes; and otherwise focusing the first scanning device and the second scanning device on a common focal position.

18. A method in accordance with claim 17, characterized in that, for the avoidance of a geometrical shadowing of a scan beam of a scanning device by an object located in the reading zone, or for the avoidance of reflection effects at the code to be scanned, the first scanning device and the second scanning device scan the reading zone with scan beams extending inclined to one another.

19. A method in accordance with claim 17, characterized in that the first scanning device and the second scanning device scan the reading zone along one of adjacent and parallel scan lines, coinciding scan lines and scan lines extending obliquely to one another at an acute angle.

20. A method in accordance with claim 17, characterized by additionally scanning the reading zone at least along a further scan direction,
wherein the scan direction and the further scan direction extend one of diagonally and perpendicular to one another; and/or
wherein the code reader is also controlled with respect to the further scan direction for scanning at different focal positions.

* * * * *